April 28, 1953     W. T. LIVERMORE     2,636,585
AUTOMATIC FLUID PRESSURE TRANSMISSION
Filed Aug. 30, 1946     2 SHEETS—SHEET 1
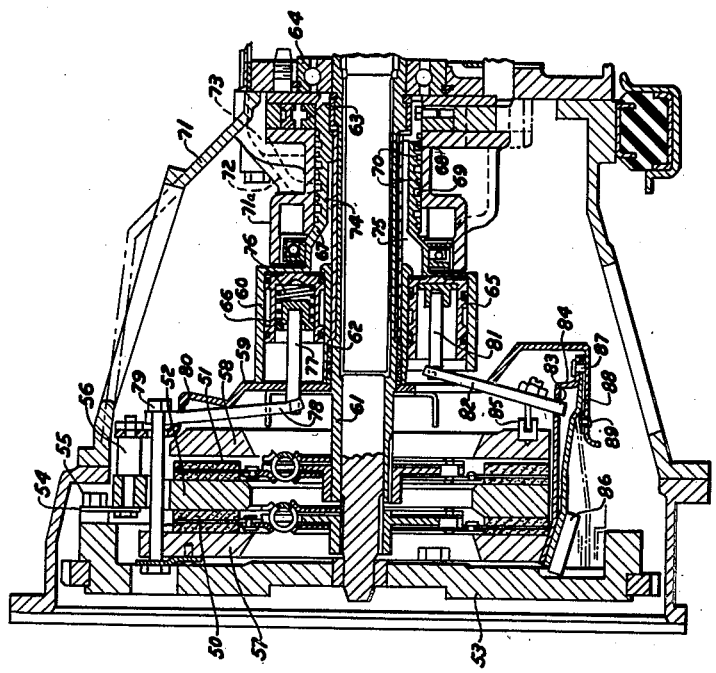
INVENTOR.
WILLIAM T. LIVERMORE
BY Joseph Farley
ATTORNEY.

Patented Apr. 28, 1953

2,636,585

UNITED STATES PATENT OFFICE 2,636,585

AUTOMATIC FLUID PRESSURE TRANSMISSION

William T. Livermore, Grosse Pointe Farms, Mich.

Application August 30, 1946, Serial No. 693,873

8 Claims. (Cl. 192—87)

This invention relates to automatic fluid pressure transmissions of the same general type as disclosed in my prior U. S. Letters Patent Nos. 2,120,104 and 2,376,545, granted June 7, 1938, and May 22, 1945, respectively, as well as in my co-pending application for patent Serial No. 504,548, now forfeited, and more particularly to improved fluid pressure operated clutch means used in conjunction with a synchronizer unit to effect engagement of various gear ratios between a vehicle's engine and output propeller shaft.

In any automatic transmission particularly designed for automotive vehicles, it is highly important that a change from one gear ratio to another gear ratio be effected as smoothly as possible without objectionable jerking effects. I have accomplished this in my prior constructions, such, for example, as disclosed in the above reference Patent No. 2,376,545 and co-pending application No. 504,548, now forfeited, by the use of various control means for the admission of fluid pressure to a pair of clutches so arranged that the rate of flow of the fluid under pressure to and from the clutch applying devices is such that there would be a certain amount of overlap of the period of engagement of the respective clutches so that, for example, when passing from low gear to second speed, engagement of the clutch for second gear takes place shortly before the low gear clutch is completely disengaged. In accordance with the present invention free wheeling units are employed in, what may be termed, the transmission gearing proper so that when one clutch is caused to be engaged to transfer the drive to a different gear ratio from a lower gear ratio which immediately preceded and which has been effective through a different clutch, the objectionable jerking effects which might otherwise be present are entirely eliminated by the presence of the free wheeling units in the gearing, the gears of lower ratio retaining the drive to the propeller shaft until the higher speed gear takes over the drive and by the overrunning effect inherent in the free wheeling unit gradually releases the gears of the lower gear ratio.

One of the principal objects of the present invention is to provide a new and improved construction for an automatic transmission, particularly of the fluid pressure clutch type, wherein clutch engagements are effected under the combined influence of engine speed through centrifugal force and pressure of the fluid being delivered to the clutch for the purpose of actuating it.

A further object is to provide a new and improved construction for a clutch housing and a transmission mounting and connections between them whereby the clutch housing and transmission will be automatically self-aligning to compensate not only for variations in manufacturing tolerances, but also for variations due to wear.

Another object is to provide improved fluid pressure means for actuating the clutches.

A further object is to provide improved expanding diaphragms for causing engagement of the friction clutches.

These and other objects will appear more clearly from a detailed description of particular embodiments of the present invention and from an examination of the drawings forming a part hereof wherein, Fig. 1 is a longitudinal vertical section through the gear clutches and other associated parts shown in cross section therein.

Fig. 2 is a longitudinal vertical section through the clutch housing, the gear clutches and other associated parts of an automotive clutch assembly.

Figures 3, 4:
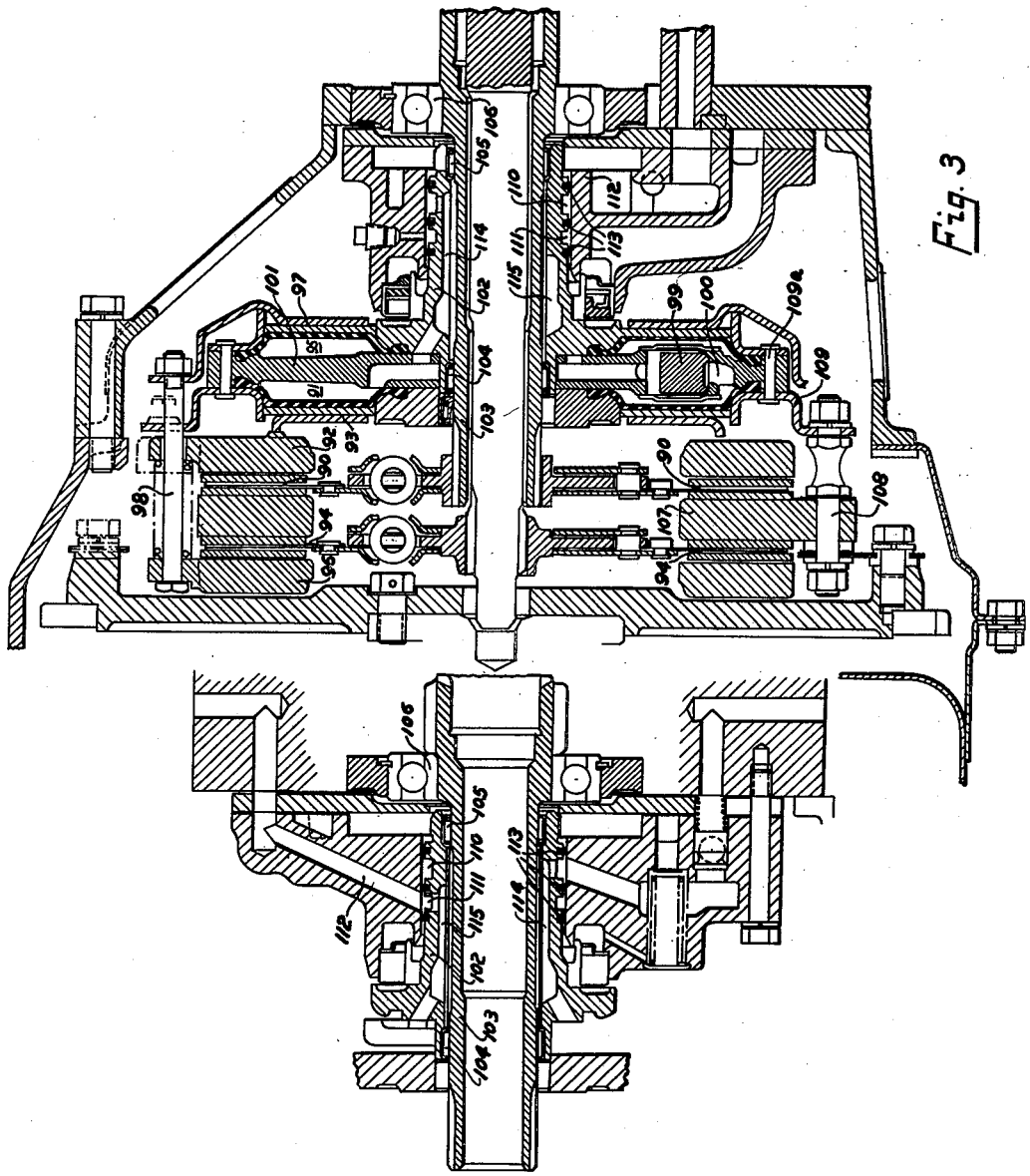
Fig. 3 is a similar vertical section through a second automotive clutch assembly.
Fig. 4 is a fragmentary sectional view of a portion of the assembly shown in Fig. 3 but taken along a plane perpendicular to that shown in Fig. 3.

As shown in Fig. 1 the numeral 10 may be considered as representing the end of the shaft of an internal combustion engine for an automotive vehicle and the numeral 11 the lateral web of the flywheel of the engine which is suitably secured to the shaft 10. Carried by the flywheel web 11 or other similar face plate for rotation therewith is a pair of clutches 12, 13. Clutch 12 is secured upon and in driving relationship with a stub shaft 14, one end of which is piloted as indicated at 15 within the end of the engine shaft 10 and the other end of which terminates in an enlarged head, the outer periphery of which is formed as a gear not shown. The shaft 14 passes through a wall 16 of a transmission housing or casing and is supported by an anti-friction bearing 17 therein. The clutch 13 is keyed upon one end of a sleeve 18. The other end of sleeve 18 likewise terminates in an enlarged head, the outer periphery of which is formed as a gear 18a.

The engagement of driven clutch elements 12 and 13 is preferably effected by means of fluid under pressure delivered under the control of automatic control devices through either of conduits 19 or 20. These conduits are connected to a collector ring 21 in which is rotatably received the extended hub 22 of a diaphragm carrying plate 22a. The conduit 19 communicates through an annular conduit 19a with a conduit 21a extending longitudinally of the hub 22 and communicates through a branch 23 with a pressure chamber 24 formed between the lateral plate 22a and a diaphragm 25 carried thereby. The conduit 20 communicates through an annular branch 20a with a similar longitudinally extending conduit 26 which in turn communicates through a branch 27 with a pressure chamber 28 formed between the plate 22a and a diaphragm 29 also carried by said plate 22a.

When fluid under pressure is delivered into the pressure chamber 24, such pressure is exerted against the inner face of the diaphragm 25 to move said diaphragm toward the right in the drawing and exert pressure on a pressure ring 30 through which passes a plurality of studs 31 secured within the plate 22a and which serve to secure the diaphragms 25, 29 to said plate. As shown, a slight clearance is left between the pressure ring 30 and the nuts 31a on studs 31. Connecting bolts 32 connect the pressure ring 30 to a clutch applying plate 33 so that under certain conditions the plate 33 will be moved toward the right causing clutch element 12 to be engaged. The slight degree of movement required to take up the clearance between the pressure ring 30 and the nuts 31a is not, however, sufficient to cause effective clutch element engagement of clutch 12 as hereinafter more fully explained.

When fluid under pressure is admitted into the pressure chamber 28, it exerts pressure upon diaphragm 29 tending to move said diaphragm to the left and by exerting pressure on the ring 34, move the clutch applying plate 33a toward the left to engage clutch element 13 by squeezing the plates thereof between the clutch applying plate 33a and a clutch backing plate 35. A plurality of shouldered studs 36 pass through suitable apertures provided in the plate 22a and in the clutch backing plate 35, nuts 37 serving to clamp the clutch backing plate 35 and the plate 22a against shoulders provided on the studs 36 to hold the plates 35 and 22a in fixed spaced relationship to each other. Secured at spaced intervals around the lateral web 11 of the flywheel is a plurality of shouldered studs 38 which are clamped securely thereto by the nuts 39. Each of these studs 38 terminates at its inner end in flattened portions 40 which pass freely into suitable slots provided about the periphery of the clutch backing plate 35.

The engagement of the studs 38 within the slots of the clutch backing plate 35 forms a driving connection between said plate and the web 11 of the flywheel and as the flywheel is secured to the engine shaft 10, the backing plate 35 will therefore be driven at engine speed. The connection formed by the studs 36 between the backing plate 35, the clutch applying plate 33 and the diaphragm carrying member 22a will likewise cause both of the latter to be driven at engine speed. It will be noted that the hub 22 is of substantial length and that it is rotatably supported by a sleeve bearing 41a upon the sleeve 18 which in turn is carried at its right hand end by the shaft 14, through the anti-friction bearing 41 interposed between the enlarged end of the sleeve 18 and the shaft 14, thus serving to hold this end of shaft 14 and sleeve 18 in accurate concentric relationship. The connection afforded by the studs 36 between the plate 22a and the clutch backing plate 35 in effect unites the clutch backing plate 35 to the members 22, 22a to form therewith a unitary structure but as the connection between the backing plate 35 and the flywheel 11 by the engagement of the flattened portion 40 of the studs 38 within the slots of the plate 35 permits a relative tilting movement between the flywheel 11 and the unitary structure consisting of the members 22, 22a and the backing plate 35, it will be seen that the parts will be self-compensating not only for variations in manufacturing tolerances but also for wear.

When friction clutches are employed for transmission of power and particularly when such clutches are used in an automobile, it is essential that means be provided for varying the amount of pressure used for engaging the clutches. For example, if a uniform clutch pressure is employed that would be sufficiently high to prevent clutch slippage at relatively high torques, the application or engagement of the clutch with such a high pressure when starting the vehicle or shifting with light torque would result in a very objectionable jerk, would throw undue strains upon the driving gears, propeller and axle shafts and in many cases would result in immediate stalling of the engine. If the clutch pressure were maintained uniformly but sufficiently low to prevent the objectionable effects just mentioned, excessive clutch slippage would inevitably correct the high torques with resulting excessive wear upon the clutch plate surfaces and objectional heating effects.

When an automobile is equipped with a conventional clutch pedal for manual engagement of the clutch, the skillful driver engages the clutch to such a degree as to permit a certain amount of clutch slippage and thereby avoids the objectionable jerking effect. To simulate this manual graduation of pressure in an automatic transmission and particularly when first gear clutch engagement is effected, it becomes highly important and desirable to have the pressure for clutch engagement varied in accordance with engine torque or throttle opening which is an indicator thereof. This is effected in the present invention by the following means:

The pressure ring 30 which, as heretofore described, is secured to the diaphragm carrying plate 22a by the studs 31 carries a plurality of weights 42 which are pivotally secured at one end to the pressure ring 30 as at 43, the other end 42a of each weight being free. The connecting bolts 32, hereinbefore referred to, are pivotally connected as at 32a to the weights 42 and said bolts pass through suitable apertures in the clutch applying plates 33 and 33a, an adjusting nut 32b being threaded on to the end of each connecting bolt 32 for engagement with the plate 33 and a spring 32c being confined between the plates 33 and 33a.

It will be seen from the foregoing description and by reference to the drawing that the springs 32c will tend to move the plate 33 toward the face plate 11 and will exert pressure upon the connecting rods 32 which, through their pivotal connection at 32a to the weights 42, will tend to normally hold the free ends 42a of the weights 42 against the outer periphery of the plate 33.

As the clutch assembly is rotated, the centrifugal force will tend to move the free ends 42a of the weights 42 outwardly. This will also tend to cause the nuts 32b to exert a pressure upon the the clutch backing plate 33 and move it away from the flywheel 11 or toward the right in the drawing, thus tending to engage the clutch 12 used in the present case to effect first gear drive. As soon as the nuts 32b come into contacting engagement with the clutch applying plate 33, the pivotal connection 32a of the rods 32 with the weights 42 will then act as a fulcrum for the weights 42 which will then, if there is no fluid under pressure within the pressure chamber 24, tend to cause them to move the pressure ring 30 toward the left distorting the diaphragm 25 in the same direction until the weights 42 reach the stops 44. Therefore, the outward movement of the weights 42 will merely result in distorting the diaphragm 25, and plate 33 will not be moved to the right far enough to apply clutch 12. If, however, there is fluid pressure within the chamber 24, it will react against diaphragm 25 and tend to prevent distortion thereof. This will then cause the pins 43 instead of the pivotal connection 32a to act as fulcrums for the weights 42 as they are moved outwardly by the centrifugal force, thus pulling rods 32 and plate 33 to the right against the springs 32c and, thereby applying clutch element 12. If the fluid pressure is sufficient to hold plate 30 against nuts 31a, the the pressure on clutch element 12 due to the centrifugal force of the weights 42 will increase as the engine speed is increased until finally it causes a clutch drag to be exerted that is great enough to prevent further increase in engine speed. The fluid pressure delivered to the pressure chamber 24 increases with the extent of throttle opening as fully disclosed in my parent co-pending application, Serial No. 539,259, and and the greater the throttle opening, the higher will be the engine speed at which this clutch drag will occur. Therefore, for each particular throttle opening, there will be a corresponding speed at which the pressure will be sufficient to prevent any further increase in speed and the pressure is thus automatically self-adjusted to throttle opening. The power thus transmitted through the clutch will start the vehicle in motion and as its speed increases, the clutch element 12 will finally run as fast as the engine and clutch slipping then ceases. As the speed of the vehicle and the engine continues to increase, the centrifugal force mounts rapidly thus preventing any further tendency to slip.

As a result of the above-described construction, the advantage of a smooth gradual initial clutch engagement by hydraulic pressure is obtained while the advantage of varying the effective clutch pressure in accordance with engine speed by centrifugal means is also utilized.

It will, of course, be understood that hydraulic pressure may also be applied at idling speeds in which case the weights would be held by the release springs from causing centrifugal engagement until the engine speed is increased. The starting action is then controlled entirely by centrifugal force, in which case, the hydraulic action would be used only to release the clutches for shifting.

It will further be understood that depending on the strength of the springs 32c, the weights 42 may move outwardly to engage the stops 44 as soon as the engine is started and reaches idling speed, but such movement of the weights would not be sufficient to apply the clutch. Therefore, when fluid under pressure is admitted to the chamber 24 and the diaphragm 25, the clutch engagement is effected hydraulically by distortion of the diaphragm which simultaneously causes the weights 42 to be moved inwardly and away from the stop 44.

Under these conditions, therefore, the weights 42 then occupy a position in which they are "cocked" as it were to be immediately responsive to speed fluctuations.

The stops 44 provided for the weights 42 serve to limit the amount of clutch pressure that can be exerted as the result of centrifugal force. Otherwise, the centrifugal forces might result in the production of stresses that would be destructive at high speeds. It will be seen from the foregoing that the combination of the hydraulic pressure and centrifugal force are required to provide enough movement to plate 33 to cause engagement of clutch element 12.

If fluid under pressure exists in the pressure chamber 28, such pressure tends to move the pressure ring 34 towards the left to exert pressure on the clutch applying plate 33a thus causing the engagement of clutch element 13. As the clutch element 13 is used in the present transmission for second speed drive and as the conditions with respect to clutch pressure in making a shift from first to second, or from high or direct drive to second gear are not as critical as the clutch pressures that are required in starting the vehicle from rest, the clutch pressures employed for application and engagement of the clutch element 13 are uninfluenced by the centrifugal effects of the weights 42, variation in the clutch pressures employed for clutch element 13 being merely those which result from the functioning of a pressure control valve which is regulated in accordance with the extent of throttle opening.

The arrangement of the weights 42 and their connection to the pressure ring 30 such that the engagement of the clutch element 12 is produced by the combined effect of engine speed and pressure within the pressure chamber 24 results in a highly efficient graduated application of the clutch compensated for varying load, torque and speed conditions. The springs 32c are preferably made of such strength that the centrifugal force exerted by the weights 42 is not sufficient when the engine is running at idling speed to overcome the resistance of such springs. When, however, the accelerator pedal is depressed to open the throttle of the engine, fluid under pressure is admitted to the chamber 24 to move the diaphragm and pressure ring 30 until the latter has taken up the clearance provided and the ring 30 has moved into engagement with the nuts 31a. At the same time, the speed of the engine is increased because of the opening of the throttle until when the engine has reached a speed slightly greater than idling speed, the weights 42 are then capable of exerting under the action of the centrifugal force a pull upon the rods 32 sufficient to overcome the resistance of springs 32c and engage the clutch element 12 with a comparatively light clutch pressure. Although this pressure is sufficient to impart drive, the conditions are equivalent to those effected by a skillful driver in slipping the clutch for parking or other maneuvers. As the accelerator pedal is still further depressed and the speed of the engine is increased, the centrifugal force imparted to the weights 42 increases until the weights exert a pull upon the rods 32 sufficiently great to engage the clutch element 12 more tightly until finally clutch slippage can no longer occur. If, at any time, the pressure exerted by the weights 42 exceeds the resistance offered by the pressure of the fluid within the chamber 24 against the diaphragm 25, such pressure will tend to move the ring 30 and diaphragm 25 towards the left, thereby squeezing the fluid under pressure out of the chamber 24 and back into the fluid pressure conduit. The result is that at no time can the clutch pressure be greater than the pressure exerted by the fluid on diaphragm 25 nor can the fluid pressure alone produce application or engagement of the clutch. The clutch pressure in the last analysis, therefore, is determined and governed by the force exerted by the weights 42 due to the centrifugal effects until the engine speed has increased to a point such that the centrifugal force on the weights 42 would tend to produce a clutch pressure greater than the resistance offered by the fluid under pressure within the chamber 24.

As it is characteristic of devices wherein weights are caused to be moved under centrifugal forces for the weights to fly out suddenly which in a centrifugal clutch tends to produce jerky clutch action, the rate of clutch application in the present invention is controlled by governing the rate at which the fluid under pressure is admitted into the pressure chamber 24, this being accomplished by the use of a restricted orifice or jet in the fluid pressure line leading to the fluid pressure chamber 24, as shown in the aforementioned parent application. It will thus be seen that by suitable calibration of the springs 32c and orifice, the clutch pressure exerted on clutch element 12 at relatively low engine speeds is governed by the centrifugal force exerted by the weights 42 while the rate of clutch application is governed by the rate at which the fluid under pressure is permitted to flow into the chamber 24. It will further be seen that by suitable adjustment of the nuts 31a and 32b and positioning of the stop 44, the clutch may be caused to be engaged with sufficient pressure for positive non-slipping drive solely by the action of the centrifugal weights 42 or solely by the pressure admitted into the chamber 24. In the latter case, therefore, the centrifugal effects may be employed for full clutch application when the car is in low gear and the hydraulic pressure relied upon for positive clutch application when the transmission is in the higher gear ratio.

It will be understood that the construction and arrangement whereby the clutch element 12 may be engaged under the combined influence of the centrifugal force of the weights 42 and the hydraulic pressure within the pressure chamber 24 is such that the manner in which the clutch is caused to function may be varied as desired by simple adjustments of the nuts 31a and 32b. For example, these nuts may be so adjusted that when fluid is initially admitted to the chamber 24 for starting purposes, although it will distort the diaphragm 25 and move the ring 30 to the right, the amount of motion so produced will not be sufficient to apply the clutch but merely sufficient to enable the diaphragm 25 to act as a reaction member for the weights 42 and so that when the engine reaches a predetermined speed of rotation, the engagement of the clutch for starting the vehicle will be produced primarily by the centrifugal action of the weights 42. After the vehicle is started, the clutch is then caused to be released and re-engaged for effecting the gear shifts by releasing and re-applying the pressure of the fluid within the chamber 24. Again by suitable adjustment, the clutch pressure may be limited by the centrifugal action and the rate of clutch application established by hydraulic action or alternatively the clutch may be employed primarily as a centrifugal clutch with a hydraulic lock-up.

The clutch assembly shown in Fig. 1 and described above is disclosed in my co-pending application for U. S. Letters Patent Serial No. 539,259, and as to such subject matter the present application is divisional and in accordance with a Patent Office action on such co-pending application requiring division between claims directed to an automatic change speed mechanism and those to a multiple clutch assembly. The multiple clutch assemblies shown in Figs. 2, 3 and 4, to be hereinafter described, include certain new features heretofore undisclosed in my previous applications, and as to such subject matter the present application forms a continuation in part of the co-pending application mentioned above.

As will be seen by a comparison of the drawings and from the following description of the clutch assemblies shown in Figs. 2, 3 and 4, the modifications included therein relate primarily to the centrifugal means for causing the engine speed to influence the engagement of the first gear clutch, although certain other improvements have likewise been incorporated.

The clutch assembly shown in Fig. 2 includes driven clutch elements 50 and 51 and a central backup plate 52 which is supported from and driven by the flywheel 53 through a plurality of steel straps 54, the outer ends of which are bolted to the flywheel by bolts 55 and the inner ends of which are bolted to the backup plate 52 by means of bolts 56. Movable pressure plates 57, 58 are mounted respectively adjacent to the clutch elements 50 and 51 and are supported from the central driving plate 52, each by three steel straps similar to the straps 54 and bolts 55 but which are not shown in the drawing because they are spaced at different points about the periphery of the central driving plate, the support of the plates 57 and 58 being such that, although the plates 57, 58 are held concentric with the axis of rotation of the flywheel, they are free to be moved longitudinally to apply pressure to the driven clutch elements 50 and 51 by the clutch actuating means now to be described.

The clutch cover 59 is supported as a unit with the central driving plate 52 by means of the bolts 56 and said clutch cover, therefore, rotates at all times with the central driving plate 52 whenever the engine is running. Said clutch cover in turn carries with it a cylinder housing 60 which is piloted upon the driving sleeve 61 by means of bushings 62, 63; sleeve 61 being in turn supported near its right hand end by a ball bearing 64. It will be seen from the above-described construction that the central driving plate 52, the clutch cover 59, the cylinder housing 60 and driving sleeve 61 thus form a single unitary assembly which is connected at one end to the flywheel 53 through the steel straps 54 and is supported near its other end by the ball bearing 64. It may be seen that the strap suspension retains the advantages of self-compensating alignment described in connection with the clutch assembly shown in Fig. 1 while completely eliminating the objectionable inherent tendency for the loose driving connections in the first embodiment to rattle or click upon application and release of drive through such connections.

Mounted in suitable cylinders formed in the cylinder housing 60 are three slidable pistons 65 for engaging the clutch element 55, and three similar pistons 66 for engaging clutch element 50. As clearly shown in Fig. 2, the cylinder housing 60 has a reduced hub extension 67 and is provided with annular grooves 68, 69 which serve as collector grooves for fluid under pressure to be delivered to the pistons 65, 66, the grooves 68, 69 being separated by piston rings 70. The reduced hub 67 of the cylinder housing is rotatably mounted within a stationary housing 71a, formed integral with casting 71 and which is provided with conduits or ducts 72, 73 which communicate, respectively, with the annular grooves 68, 69. Groove 69 communicates through a longitudinally extending groove 74 with the pistons 66, while groove 68 communicates through longitudinal groove 75 with the piston 65.

If clutch element 50 is to be engaged, oil is transmitted through duct 72 to groove 69 and thence through longitudinal passage 74 to pistons 66. The oil pressure building up on the right hand end of pistons 66 is transmitted through cushion springs 76 to piston rods 77, to the inner ends of levers 78, and to the bolts 79 which serve as tension members, the levers 78 pivoting in suitable apertures 80 provided in the clutch cover 59, and causing the clutch pressure plate 57 to be pulled to the right by the bolts 79 to clamp the driven clutch element 50 between the central backing plate 52 and the clutch pressure plate 57.

If clutch element 51 is to be engaged, oil is transmitted through the duct 73, groove 68, longitudinal passage 75 to the pistons 65, and, as the oil pressure builds up behind pistons 65, the pistons are moved to the left and the piston rods 81 exert pressure upon the inner ends of the levers 82, causing said levers to be moved upon their fulcrumed pivotal engagement, like the levers 78, in suitable openings 83 provided in a lever 84 and through which openings the outer ends of the lever 82 project. As the piston rods 81 and levers 82 are moved towards the left, as above described, this movement is communicated to the pressure plate 52 through the pivotally mounted strut or push rods 85. The parts are so constructed that the stroke imparted to pistons 65 by the oil pressure is limited and does not impart to the right hand pressure plate 58 a sufficient amount of motion to cause said plate to produce driving engagement of the clutch element 51.

Initial engagement of the clutch element 51 in cooperation with the movement of the levers 82 by the pistons 65 is produced by means of centrifugal weights 86, which are mounted upon the left hand ends of levers 84. Secured to the right hand end of levers 84, by means of rivets 87, is one end of a flexible steel strip 88, the other end of which is secured by a row of rivets 89 to a flat portion of the clutch cover 59. The side of lever 84 adjacent to the steel strip 88 is arcuate in form so that, as the weights 86 move outwardly under the influence of centrifugal force, the arcuate surface of the lever rolls upon the flexible strip 88 and causes said strip to be rolled up on the arcuate surface of the lever 84. This movement obviously will cause the outer end of lever 82 to be moved toward the left and this motion together with that imparted to said lever by the hydraulic pistons 65 is sufficient to move the clutch pressure plate 58 an amount sufficient to produce driving engagement of the clutch element 51. The parts are so dimensioned and adjusted that without the cooperation of the hydraulic pistons 65, the motion or action of the centrifugal means is not sufficient to produce engagement of clutch element 51, and likewise the motion of the pistons 65, as hereinbefore described, is insufficient to produce engagement of said clutch without the action of the centrifugal means.

When the engine is stationary, release springs (not shown) of any common or usual construction provided between the central clutch backing plate 52 and the clutch pressure plate 58 hold the centrifugal weights and levers 86 and 84 in their inward position and against the periphery of the clutch pressure plate 57, which serves as a stop to limit the inward movement of the weights 86 to the position in which they are shown in Fig. 2 of the drawing, and with the clutch element 51 disengaged. These springs are of such strength that they permit the weights 86 to move outwardly under the influence of centrifugal force until they contact against the inside of the rim of the flywheel 53 in the dotted line position, shown in Fig. 2 of the drawings, at the idling speed of the engine. The vehicle is started by admitting fluid under pressure to the pistons 65 and the engine is simultaneously speeded up by opening the throttle. As the centrifugal weights are already held in the outer dotted line position by the centrifugal force, the clutch element 51 will be engaged at a rate depending upon the rate at which the oil flows to pistons 65. The pressure on the clutch, however, will be limited by the amount of centrifugal force exerted by the weights 86. If the engine is running slowly and the centrifugal force on the weight is therefore light when the pistons 65 are caused to be moved to the end of their stroke by the oil pressure, the weights 86 will be moved inwardly part way toward their innermost position. If it is assumed that the throttle is now open a certain amount, the speed of the engine will consequently increase, the centrifugal force exerted on weights 86 will be correspondingly increased, and clutch element 51 will be engaged with a corresponding pressure. As the engine speed and this pressure increase together, the point will be reached where the pressure will be sufficient to prevent further increase in engine speed. If the throttle is held in this position, the clutch will continue to slip at a constant engine speed until the vehicle is moving fast enough so that the driven clutch element 51 will finally be turning the same speed as the engine and the clutch slippage will then cease. The speed of the engine then further increases and the force exerted by the weights 86 eventually becomes great enough so that the pistons 65 are forced to the right by the action of the levers 82, and the weights 86 assume their outermost position against the rim of the flywheel as a stop. It will thus be seen that the oil pressure against the pistons 65 acts as a yieldable cushion member not only to prevent excessive forces being exerted at high engine speeds by the centrifugal force upon the weights 86 and thereby damaging the mechanism, but the oil pressure on the pistons 65 serves to place an upper limit upon the pressure which can at any time be applied to clutch element 51.

It is to be noted that throughout the range of engine speeds at which slipping occurs the clutch pressure is controlled by the centrifugal weights 86, while the rate at which the pressure builds up to this amount is, however, controlled hydraulically by the action of the pistons 65.

Experience with centrifugal clutch actuating means has proven them to be a very satisfactory means for regulating clutch pressure, except for the instance of initial clutch engagement which is often very sudden and causes an objectionable backlash noise or a bumping jerk in the driving parts between the clutch and the wheels of the vehicle. Hydraulic means on the other hand provides a very smooth method of obtaining initial engagement. Therefore, the arrangement above described provides the combined advantages of both hydraulic and centrifugal controls.

A sudden initial engagement of a centrifugal clutch, as above referred to, is caused by the fact that as the centrifugal weights move outwardly, the centrifugal force increases due to the increase in the radial distance to which the weights are moved from the axis of rotation. Therefore, as soon as the weights begin to move outwardly, even though their speed of rotation may not change, the weights are caused to move suddenly from their inner to their outermost position. The method of mounting the centrifugal levers 84, as herein described and shown, completely eliminates this tendency towards sudden action of the weights because as the weights 86 swing outwardly and the arcuate portions of the levers 83 move or roll upon their points of support upon the flexible strip 88, the effective lever or moment arm of each of the levers 84 is automatically reduced by an amount sufficient to compensate for the above described increase in the centrifugal force due to the increase in the radial distance of the weights from the axis of rotation.

Referring to the modified clutch assembly shown in Figs. 3 and 4, driven clutch element 90 is engaged by means of fluid pressure within an annular diaphragm chamber 91 moving pressure plate 92 through a plate 93 associated with the diaphragm 91 and in a similar manner clutch element 94 is engaged by fluid pressure introduced into a diaphragm chamber 95 which transmits movement to pressure plate 96 by means of plate 97 and bolts 98. The influence of engine speed in effecting engagement of clutch element 90 is accomplished through the use of a centrifugal valve 99 held with a pressure proportional to the speed of the engine in closing position over an exhaust port 100 associated with the diaphragm 91.

The diaphragms associated with chambers 91 and 95 are seated in a diaphragm plate 101 having a hub 102 piloted to a sleeve 103 upon bearings 104 and 105. The sleeve 103 is in turn supported at its right hand end by a ball bearing 106. The diaphragm plate 101 is connected to and driven by a central backing plate 107 through a plurality of circumferentially spaced bolts 108 and through a clutch cover 109 riveted to the diaphragm plate 101 as at 109a. The rotating hub 102 of the diaphragm plate 101 is provided with annular grooves 110, 111 and rotates within a cylindrical bore in a stationary housing 112. These grooves are separated and sealed by piston rings 113. A longitudinal duct 114 communicating with the annular groove 110 transmits oil under pressure to diaphragm chamber 91. This chamber communicates with the exhaust port 100 and centrifugal valve 99 which are located in the diaphragm plate 101. A similar duct 115 leads from the annular groove 111 to the diaphragm chamber 95 for engaging clutch element 94. These connections are clarified in Fig. 4 which shows a fragmentary cross sectional view of the clutch conduits in a plane disposed 90° to the cross sectional plane shown in Fig. 3.

Since the movement of the centrifugal valve 99 from a position which permits sufficient exhausting with the fluid under pressure to prevent engagement of the clutch element 90 to a full blocking position is very slight, the radial position of the valve remains substantially constant at all times and it is therefore unnecessary to compensate for the effect of an increase in the radial position which normally causes a centrifugal weight to move suddenly from its inner to its outermost position.

It will be noted that the engine speed which would cause the centrifugal valve 99 to fully block the exhaust port 100 will vary with the pressure of the oil introduced into diaphragm 91 and for all engine speeds below the full blocking speed for any given pressure introduced into such diaphragm, the centrifugal valve 99 will determine the effective pressure of clutch application.

In starting a vehicle under full or any intermediate throttle position, the control means other than the centrifugal valve, such as pressure control means responsive to accelerator position, for determining the available fluid pressure for actuating the first gear clutch may operate in a manner that will normally provide fluid pressure somewhat higher than the effective blocking pressure of the centrifugal valve 99 during all intermediate periods prior to the establishment of positive drive so that the centrifugal valve 99 will determine the clutch application pressure until positive drive is established.

While centrifugally actuated clutch means responsive to engine speed is an effective method of obtaining a smooth properly regulated starting clutch engagement, a number of distinct disadvantages would attend the use of such means alone. High idling devices operative when the engine is cold to increase the idling speed would tend to cause creeping in low gear when the accelerator is released with the gear shift set for forward operation. In addition, when the transmission is in neutral position, such a centrifugally operated clutch would tend to rotate the free gears between the clutch and the neutral gear during high idling periods which would cause clashing of gears upon an attempt to shift into forward or reverse.

However, by combining centrifugally actuated pressure regulating means as described above with pressure control means responsive to accelerator position, the advantage of smooth engagement of the first gear clutch through the use of such centrifugal means is retained, while high idling difficulties are overcome.

It will be noted that in each of the embodiments disclosed herein, centrifugally actuated clutch pressure regulating means is used in connection with only one of the clutches, in each case the clutch associated with low gear. This has been found desirable since vehicles are frequently operated in high gear, associated with the other clutch, at relatively low engine speeds such that the use of centrifugally actuated means for modifying clutch pressure would result in excessive clutch slippage under such circumstances. Furthermore, the engaging pressure of the clutch associated with the relatively higher gears is not as critical as in the case of the low gear clutch and may be adequately controlled through the use of pressure regulating means responsive to accelerator position, or similar control means, thereby avoiding the clutch slippage mentioned above.

While I have shown and described three satisfactory embodiments of a multiple clutch assembly in accordance with the principles of the present invention, it will be understood that many changes, variations and modifications in the specific constructional details thereof may be resorted to without departing from the spirit of the invention as set forth in the claims hereunto appended.

I claim:

1. In a transmission, a multiple clutch assembly comprising an annular power driven rotating member, a shaft and a sleeve axially aligned with said member and separately rotatable relative to each other and said member, a pair of longitudinally spaced annular clutch elements drivingly connected to said shaft and sleeve respectively, an assembly driven at the speed of said annular member including a double faced pressure plate interposed between said clutch elements and a longitudinally movable pressure plate on the outer side of each of said clutch elements, and selective means for moving each of said outer pressure plates toward said intermediate pressure plate to effect driving engagement of one of said clutch elements, said latter means comprising an annular diaphragm plate having a fixed relation with said intermediate pressure plate, a diaphragm and pressure chamber on either side of said diaphragm plate, and actuating means connecting each of said diaphragms with one of said outer pressure plates.

2. In a transmission, a multiple clutch assembly comprising an annular power driven rotating member, a shaft and a sleeve axially aligned with said member and separately rotatable relative to each other and said member, a pair of longitudinally spaced annular clutch elements drivingly connected to said shaft and sleeve respectively, a rotating assembly driven at the speed of said annular member including a plurality of annular pressure plates adapted to bear against either side of each of said clutch elements when selectively actuated, an annular diaphragm plate, a diaphragm and pressure chamber on either side of said diaphragm plate, and actuating linkages from said diaphragms to certain of said pressure plates for selectively rendering effective the engagement of each of said clutch elements, and means for introducing effective pressure into each of said pressure chambers.

3. In a transmission, a multiple clutch assembly comprising an annular power driven rotating member, a shaft and a sleeve axially aligned with said member and separately rotatable relative to each other and said member, a pair of longitudinally spaced annular clutch elements drivingly connected to said shaft and sleeve respectively, a rotating assembly driven at the speed of said annular member including a plurality of annular pressure plates adapted to bear against either side of each of said clutch elements when selectively actuated, an annular diaphragm plate, a diaphragm and pressure chamber on either side of said diaphragm plate, actuating linkages from said diaphragms to certain of said pressure plates for selectively rendering effective the engagement of each of said clutch elements, and a collector sleeve concentric with said shaft provided with separate conduits leading to each of said pressure chambers, a stationary collector housing being provided with separate passages communicating with each of said conduits.

4. In a transmission, a multiple clutch assembly comprising an annular power driven rotating member, a shaft and a sleeve axially aligned with said member and separately rotatable relative to each other and said member, a pair of longitudinally spaced annular clutch elements drivingly connected to said shaft and sleeve respectively, an assembly driven at the speed of said annular member including a double faced pressure plate interposed between said clutch elements and a longitudinally movable pressure plate on the outer side of each of said clutch elements, an annular diaphragm plate having a fixed relationship relative to said intermediate pressure plate, a diaphragm and pressure chamber on either side of said diaphragm plate, an actuating linkage from each diaphragm to one of said outer pressure plates for moving the same toward said intermediate pressure plate to effect driving engagement of one of said clutch elements, and a collector sleeve concentric with said shaft provided with separate conduits leading to each of said pressure chambers, a stationary collector housing being provided with separate passages communicating with each of said conduits.

5. In a transmission, a multiple clutch assembly comprising an annular power driven rotating member, a shaft and a sleeve axially aligned with said member and separately rotatable relative to each other and said member, a pair of longitudinally spaced annular clutch elements drivingly connected to said shaft and sleeve respectively, an assembly driven at the speed of said annular member including a double faced pressure plate interposed between said clutch elements and a longitudinally movable pressure plate on the outer side of each of said clutch elements, an annular diaphragm plate having a fixed relationship relative to said intermediate pressure plate, a diaphragm and pressure chamber on either side of said diaphragm plate, an actuating linkage from each diaphragm to one of said outer pressure plates for moving the same toward said intermediate pressure plate to effect driving engagement of one of said clutch elements, and means for introducing effective pressure into each of said pressure chambers.

6. In a transmission, an annular power input member, a multiple clutch assembly having driving and driven elements axially aligned with said input member, said driving elements including a central axially fixed double-faced pressure plate and an axially movable pressure plate on either side thereof, said driven elements including an annular member interposed between each of said movable pressure plates and said double-faced central pressure plate, means for actuating one of said movable pressure plates to engage a driven member while the other is released, and a flexible strap driving connection between said annular power input member and an axially fixed member of said clutch assembly adapted to accommodate a limited axial misalignment between said annular power input member and said clutch assembly.

7. In a transmission, an annular power input member, a multiple clutch assembly having driving and driven elements axially aligned with said annular power input member, said driving elements including a central axially fixed double-faced pressure plate and an axially movable pressure plate on either side thereof, said driven elements including an annular member interposed between each of said movable pressure plates and said double-faced pressure plate, means for actuating one of said movable pressure plates to engage a driven member while the other is released, a driving connection between said input member and said clutch assembly, said driving connection being substantially rigid in a transverse plane and relatively yielding in a longitudinal plane in a manner adapted to provide for limited axial misalignment between said power input member and said clutch assembly.

8. In a transmission, an annular power input member, a multiple clutch assembly having driving and driven elements, said driving elements including a central axially fixed double-faced pressure plate and an axially movable pressure plate on either side thereof, said driven elements including an engageable member interposed between each of said movable pressure plates and said central pressure plate, an annular reaction member axially displaced from said central pressure plate beyond one of the adjacent movable plates, a rigid connection between said reaction member and an axially fixed member of said central pressure plate, means adapted to react against said annular reaction member for actuating one of said movable pressure plates to engage a driven member while the other is released, and a driving connection between said annular power input member and said clutch assembly, said driving connection being substantially rigid in a transverse plane and relatively yielding in a longitudinal plane in a manner adapted to accommodate a limited axial misalignment between said annular power input member and said clutch assembly.

WILLIAM T. LIVERMORE.

References Cited in the file of this patent

UNITED STATES PATENTS

| Number | Name | Date |
|---|---|---|
| 794,899 | Sturtevant et al. | July 18, 1905 |
| 1,991,124 | Sharpe | Feb. 12, 1935 |
| 2,003,212 | Millican et al. | May 28, 1935 |
| 2,078,466 | Stauffer et al. | Apr. 27, 1937 |
| 2,094,449 | Forichon | Sept. 28, 1937 |
| 2,100,810 | Livermore | Nov. 30, 1937 |
| 2,163,202 | Kegresse | June 20, 1939 |
| 2,167,705 | Batten | Aug. 1, 1939 |
| 2,270,467 | Nutt | Jan. 20, 1942 |
| 2,275,204 | Smirl | Mar. 3, 1942 |
| 2,277,557 | Nutt | Mar. 24, 1942 |
| 2,328,090 | Nutt | Aug. 31, 1943 |
| 2,328,092 | Nutt | Aug. 31, 1943 |
| 2,345,244 | Eason | Mar. 28, 1944 |
| 2,376,545 | Livermore | May 22, 1945 |
| 2,386,217 | Kegresse | Oct. 9, 1945 |
| 2,440,589 | Kegresse | Apr. 27, 1948 |
| 2,485,688 | Banker | Oct. 25, 1949 |